United States Patent [19]

Hamrick

[11] Patent Number: 5,706,742
[45] Date of Patent: Jan. 13, 1998

[54] METHOD OF FEEDING SOLID PARTICLES FROM A ZONE OF LOW PRESSURE TO A ZONE OF HIGH PRESSURE

[76] Inventor: Joseph T. Hamrick, 4353 Windy Gap Dr., Roanoke, Va. 24014

[21] Appl. No.: 593,427

[22] Filed: Jan. 29, 1996

[51] Int. Cl.⁶ ........................................... F23K 3/00
[52] U.S. Cl. ............... 110/286; 60/39.464; 222/361; 110/289
[58] Field of Search .................. 110/101 R, 101 A, 110/101 C, 101 CF, 101 CB, 101 CD, 102, 233, 267, 292, 293; 222/361, 362; 60/39.464

[56] References Cited

U.S. PATENT DOCUMENTS

| 396,020 | 1/1889 | Barbour | 110/102 |
|---|---|---|---|
| 5,341,637 | 8/1994 | Hamrick | 60/39.464 |

Primary Examiner—Henry A. Bennett
Assistant Examiner—Pamela A. O'Connor

[57] ABSTRACT

An apparatus 10 for feeding solid particles from a low pressure zone to a high pressure zone which generally comprises a live bottom bin 11 for feeding solid particles into a flow dividing auger 12 filling compartments 13 and 14 which in turn alternate in feeding chambers 19 and 20 in reciprocating feeder 15. Chambers 19 and 20 alternate after filling in moving to the zone of high pressure where the solid particles are discharged into a paddle wheel device 16 for even distribution into high pressure chamber 17. Reciprocating piston assembly 24 is actuated by a double acting cylinder 23 which is timed in consonance with the live bottom bin 11 to move the assembly to a discharge mode after either chamber 19 or 20 is filled.

2 Claims, 1 Drawing Sheet

METHOD OF FEEDING SOLID PARTICLES FROM A ZONE OF LOW PRESSURE TO A ZONE OF HIGH PRESSURE

FIELD OF THE INVENTION

This invention relates to continuous feeding of solid particles from a zone of low pressure to a zone of high pressure. An apparatus for that purpose is needed for feeding solids into such items as the combustion chambers of combustion turbines pressurized gasifiers and wood digesters.

BACKGROUND OF INVENTION

One of the major problems encountered in use of solids to fuel a combustion turbine or gasifier is injection of the solid particles into a high pressure chamber. U.S. Pat. No. 5,341,637 discloses a biomass burning system that uses a series of rotary valves to inject biomass fuels such as sawdust and sugarcane bagasse into a pressurized combustion chamber. To assure satisfactory functioning of the rotary valve arrangement disclosed in the '637 patent for pressures on the order of 150 pounds per square inch three to four rotary valves in series must be operated in a balanced mode. Balancing of pressures through the valves has proven difficult and is a weakness of that arrangement. It is the object of this invention to disclose a single stage apparatus that can feed biomass into zones of pressure well above 150 pounds per square inch. It is a further object to provide a more efficient and maintenance free feeding method.

DISCLOSURE OF THE INVENTION

In accordance with the present invention an apparatus for feeding from a low pressure zone to a high pressure zone is provided. The apparatus utilizes linear reciprocal motion to alternately move each of two opposing piston sealed chambers from a filled position of low pressure to a discharge position of high pressure. As each chamber returns to the discharge position a restrictive shield moves into place to hold up the flow of solid particles for recharging until the chamber returns to the fill position. The piston sealed chambers are moved rapidly from the fill position to the discharge position by means of a pneumatically or hydraulically operated double acting cylinder. The operation of the cylinder is timed so as to allow simultaneous filling of one chamber while discharging the opposite chamber. The discharged solids fall into a paddle wheel device resembling a rotary valve for the purpose of distributing them evenly into the pressurized chamber below. The rotational speed of the paddle wheel device is governed by a controllable speed motor that is electrically synchronized with the live bottom bin that meters the solid particles to the feed train. A central control system that controls the feed rate from the live bottom bin also controls the valves that meter compressed air or hydraulic fluid to the operating cylinder.

PREFERRED EMBODIMENT OF THE INVENTION

Figure 1:
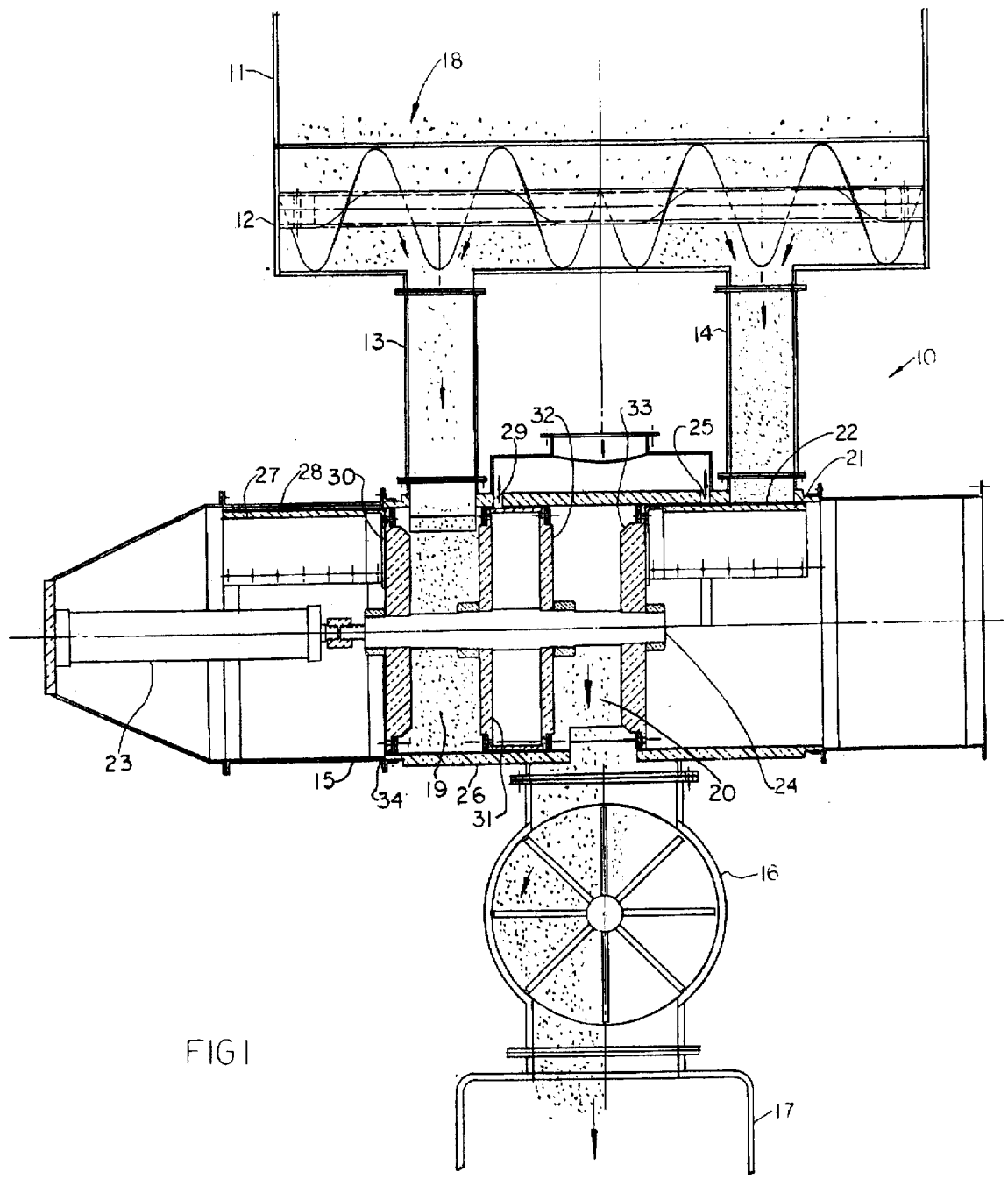
FIG. 1 shows a live bottom bin that discharges across the length of a flow dividing auger that feeds two in line storage compartments above the reciprocating chambers. The reciprocating chambers feed into the paddle wheel device which in turn discharges into the high pressure chamber.

A method of feeding solid particles into a high pressure chamber is illustrated at 10 in the FIGURE. The embodiment is comprised in general of a live bottom bin 11, flow dividing auger 12, filling compartments 13 and 14, reciprocating feeder 15, paddle wheel device 16, and pressurized chamber 17. In the preferred embodiment the solid particles 18 are 1/32 to 1/16 inch in mean diameter. The particles may be biomass or other solids such as peat, lignite, or coal. In the preferred embodiment solid particles 18 are loaded into the live bottom bin 11 and fed into the flow dividing auger 12. The auger segments in 12 are oriented so that particles are fed equally into the two filling compartments 13 and 14. The volume of each compartment is the same as that of each chamber 19 and 20 in the reciprocating feeder 15. In the mode of operation shown in the figure chamber 19 is undergoing filling as particles are being fed into compartments 13 and 14. The particles that are fed into compartment 14 are held there by the arc shaped shield 21 and its teflon facing 22. The actuation of the double acting cylinder 23 is timed so that when chamber 19 is filled the piston assembly 24 is moved rapidly to the opposite end of the feeder 15. As the assembly 24 is moved toward the opposite end pressurized air trapped in chamber 20 is exhausted through port 25 in the hard chrome plated cylindrical housing 26 before chamber 20 reaches its filling position. On the opposite end the arc shaped shield 27 with its teflon facing 28 moves into position to block flow from compartment 13. As chamber 19 moves into position over the paddle wheel device 16 the solid particles are discharged downward into the paddle wheel device 16 and thence into the pressurized chamber 17. When filling of chamber 20 is completed the cylinder is actuated in the opposite direction and the process repeated. Pressurized air is then exhausted through port 29. Pistons 30,31,32, and 33 are fitted with high density nylon seals 34. The pistons are so spaced that escape of the pressurized air occurs before chambers 19 and 20 move into place for filling thereby preventing blowback into the low pressure supply stream. The objective of hard chrome plating inside the cylindrical housing is to minimize erosion of the cylinder walls by sawdust and other solids that might be abrasive.

Having thus described the aforementioned invention, I claim:

1. A method for feeding biomass particles to fuel a gas turbine comprising:

a filling means comprised of a piston assembly having a plurality of pistons that allows for the filling of solid particles from a low pressure zone to a high pressure zone for discharging into a high pressure combustion chamber, a reciprocating means which allows movement of the piston assembly to alternate filling and discharging positions for chambers bounded by the pistons and cylinder walls, a venting means that allows exhausting of a pressurized residual air, thereby eliminating blowback into the low pressure zone; and, a sealing method with high density nylon pistons seals that resist abrasion, whereby the biomass particles are supplied to the turbine on a continuous basis.

2. A method for feeding biomass particles to fuel a gas turbine incorporating:

a discharging means having a live bottom bin that feeds solid particles across the length of a flow dividing auger, wherein the auger feeds into two in line storage compartments above a reciprocating feeder, and;

a controlling means to provide even discharge of the solid particles from a paddle wheel device into the high pressure chamber, whereby the biomass particles are supplied to the turbine on a continuous basis.

\* \* \* \* \*